No. 856,448. PATENTED JUNE 11, 1907.
W. COOPER.
CONTROL SYSTEM FOR ELECTRIC VEHICLES.
APPLICATION FILED OCT. 3, 1906.
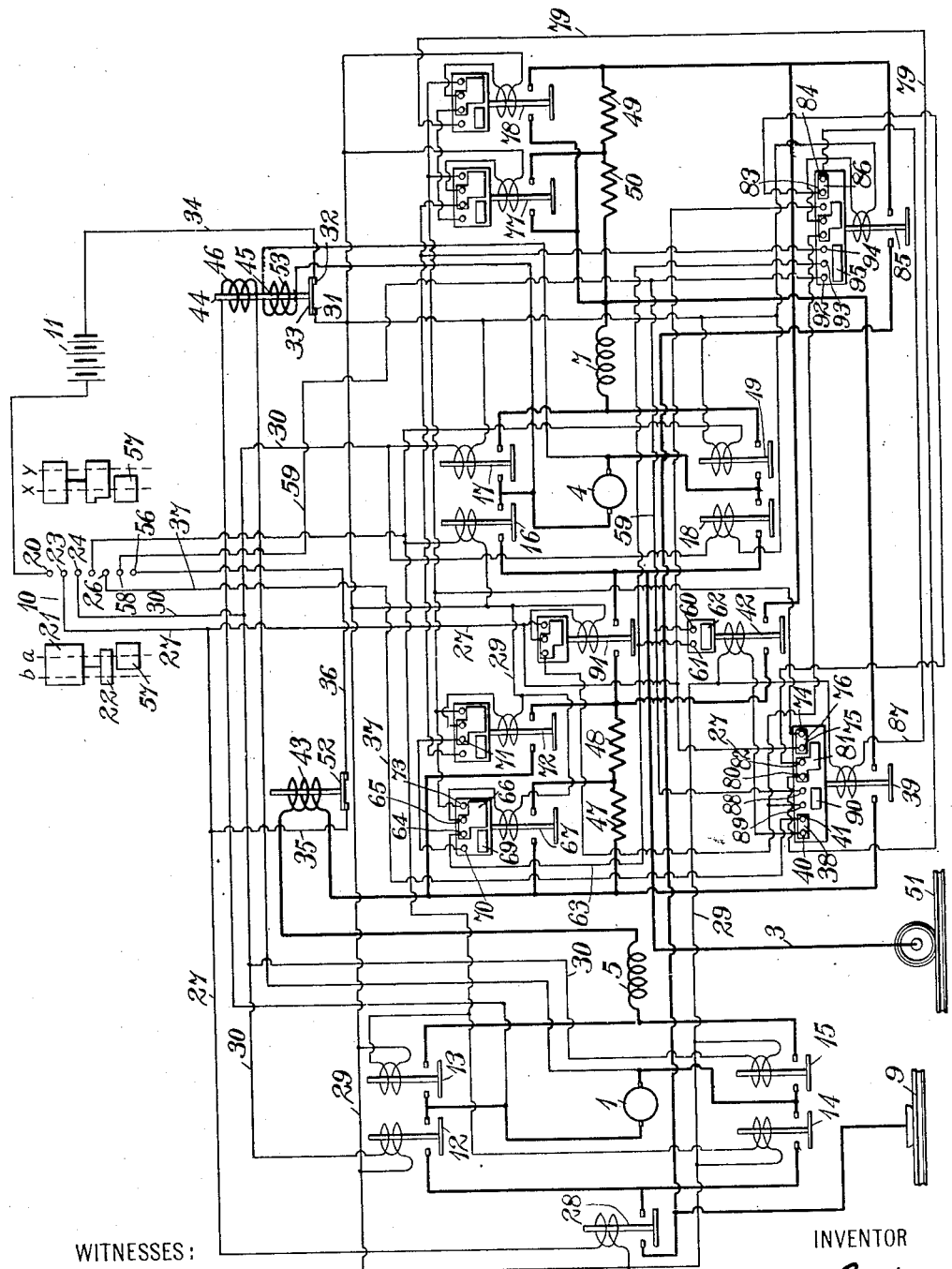
WITNESSES:
Fred H. Miller
R. J. Dearborn
INVENTOR
William Cooper
BY
Wesley G. Carr
ATTORNEY

UNITED STATES PATENT OFFICE.

WILLIAM COOPER, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC VEHICLES.

No. 856,448.   Specification of Letters Patent.   Patented June 11, 1907.

Application filed October 3, 1906. Serial No. 337,289.

*To all whom it may concern:*

Be it known that I, WILLIAM COOPER, a citizen of the United States, and a resident of Wilkinsburg, in the county of Allegheny and State of Pennsylvania, have invented a new and useful Improvement in Control Systems for Electric Vehicles, of which the following is a specification.

My invention relates to systems of electric motor control and particularly to systems of this class which are adapted for the control of electric vehicles having a plurality of similar driving motors.

The object of my invention is to provide means for automatically interrupting the supply of energy to the motors of an electric vehicle upon the occurrence, for any reason, of a material difference in the motor speeds.

When electric vehicles, having two or more driving motors which are severally geared or otherwise connected to the driving axles of the vehicle trucks, are started on a grade or under other severe load conditions, one pair of vehicle wheels sometimes slips so that the speed of its driving motor is materially increased above that of the other motors. As the speed of one of the motors is thus increased, the counter-electromotive force of the circuit in which it is connected is materially augmented so that the current is decreased and the tractive effort exerted by the vehicle is seriously diminished. In order that the motors may again exert a maximum torque, it is desirable to interrupt the supply of energy thereto and temporarily re-insert such portions of resistance as had been excluded from the circuit in accelerating the motors before the slipping occurred.

According to my present invention, I provide means dependent upon a material difference in the speeds of the several motors for automatically interrupting the supply of energy to the motors of an electric vehicle.

The single figure of the accompanying drawing is a diagrammatic view of a system of electric vehicle control arranged in accordance with my invention, which embodies two similar electric driving motors that are controlled by a plurality of electric switches and are equipped with means whereby automatic acceleration may be effected.

As illustrated in the drawing, a differential relay is provided which comprises a movable contact bearing member, two similar oppositely wound magnet windings therefor which are respectively connected across the armatures of the two vehicle motors, and a bridging contact member which interrupts the control circuits of the system when the two similar magnet windings are unequally energized.

It will be understood that my invention is not restricted to the arrangement shown and that its application may be adapted to vehicle control systems comprising two or more electric motors, either with or without means for effecting automatic acceleration.

Referring to the drawing, a plurality of electric motors comprising armatures 1 and 4 and field magnet windings 5 and 7 are supplied with energy from a line conductor 9, the motor circuit connections being determined by a plurality of electrically operated switches. The action of these switches is determined by a master controller 10 which is adapted to occupy a plurality of positions *a*, *b*, *x* and *y* and through which energy may be supplied to the acuating coils of the switches from a battery 11.

The direction of rotation of the armatures of the motors is determined by a plurality of reversing switches 12, 13, 14, 15, 16, 17, 18 and 19. When the master controller 10 is moved from its "off" position to the position *a*, in which automatic acceleration is permitted, energy is supplied from the battery 11 through a contact finger 20 to contact ring segments 21 and 22 which are first engaged by a plurality of fingers 23 and 24, the contact ring segment 22 being finally engaged by contact finger 26. From contact finger 23, energy is supplied through conductor 27 to the actuating coil of the switch 28 and the circuit is completed from this point through a conductor 29, contact fingers 31 and 32, which are normally connected by bridging contact member 33, and a conductor 34 to the negative terminal of the battery 11. From the contact finger 24, energy is supplied through a conductor 30 to the actuating coils of the switches 12, 15, 17 and 18 which determine the direction of rotation of the motors, a circuit being similarly completed from each of these coils through the battery negative conductor 29.

Energy is supplied from the contact finger 26, through a conductor 37 and through a bridging contact member 38, which is located on a switch 39 and is engaged by a pair of contact fingers 40 and 41 when said switch is in its open circuit position, to the actuating coil of a switch 42, from which point the circuit is completed to the battery negative conductor 29. The aforesaid actuating coils being energized, the switches 28, 12, 15, 17, 18 and 42 are closed and, consequently, a circuit is completed from the line conductor 9 through switches 28 and 12, armature 1, switch 15, field magnet winding 5, magnet coil 43 of a switch 52, resistance sections 47 and 48, switch 42, resistance sections 49 and 50, field magnet winding 7, switch 17, armature 4, switch 18 and conductor 3 to an opposite line conductor 51. Thus it will be observed that the motors are first connected in series relation, with resistance sections 47, 48, 49 and 50 included in circuit therewith. When the switch 42 is first closed, the current flowing in the motor circuit is usually sufficient to open a switch 52 having an actuating magnet winding 42, thereby temporarily suspending the automatic acceleration until the counter-electromotive force of the motors has sufficiently increased with their speed to reduce the current flowing in the circuit and to permit the switch 52 to close. When the switch 52 is closed, a circuit is completed from contact finger 23 through conductor 35, switch 52, conductor 36, contact fingers 56 and 58, which are connected by ring segment 57 when the controller 10 occupies either position a or position x, conductor 59, contact fingers 60 and 61, which are engaged by bridging contact member 62 when the switch 42 is closed, conductor 63, contact fingers 64 and 65, which are engaged by bridging contact member 66 when a switch 67 is open, and through the actuating coil of the switch 67 to the battery negative conductor 29.

When the switch 67 is closed, the contact finger 64 is disengaged from the bridging contact member 66 and moves into engagement with contact member 69, which is also engaged by a contact finger 70, so that the accelerating circuit is now continued from the finger 64, through the contact member 69 and contact finger 70 to a contact finger 71 of a switch 72, to short-circuit the resistance section 48. The contact member 66 of the switch 67 now engages contact finger 65, and also a contact finger 73 that is supplied with energy directly from the conductor 27 through contact fingers 74 and 75, the latter being engaged by a bridging contact member 76 when the switch 39 is open. In this way, the switch 67, after being closed, is held in this position, irrespective of the limiting switch 52, since its operating coil is now supplied with energy directly from the positive terminal of the battery through the master controller.

The steps involved in the closure of the switch 67 are repeated for the switch 72 and for a plurality of switches 77 and 78 which are adapted to short-circuit resistance sections 50 and 49, the first step in the operation of each switch being dependent upon the limiting device.

When switch 78 is closed, the motors are connected across the line with substantially no external resistance in the circuit. The switch 39 is next closed, energy being supplied to its actuating coil through a conductor 79, contact finger 80, bridging contact member 81, contact finger 82, contact fingers 83 and 84 of a switch 85, which are engaged by a bridging contact member 86 when said switch is open, conductor 87 and, through the actuating coil of the switch 39, to the battery negative conductor 29.

As soon as the switch 39 is closed, the actuating magnet of the switch 42 becomes deenergized by reason of the dis-engagement of the contact fingers 40 and 41 from the bridging contact member 38. Furthermore, contact fingers 74 and 75 become dis-engaged from the bridging contact member 76 so that the circuit which has supplied energy for holding the switches 67, 72, 77 and 78 closed, is interrupted, and the switches are opened. The motor circuit is now completed, from the coil 43, through switch 39 to field magnet winding 8 so that the circuit connections of the motors remain the same, except that a single shunt short-circuits the sections of resistance, instead of the several shunts as hereinbefore indicated.

When the switch 42 is opened, contact fingers 60 and 61 are dis-engaged from bridging contact member 62. The circuit from the conductor 59 is now continued through contact fingers 88 and 89, which have moved into engagement with a bridging contact member 90, and energy is supplied to the actuating coils of switches 91 and 85. These coils are thereafter immediately transferred in a well known manner from the accelerating circuit to a holding circuit which is independent of the limiting device.

As soon as the switch 85 is closed, the contact fingers 83 and 84 become dis-engaged from the bridging contact member 86 so that the actuating coil of the switch 39 is deenergized and the switch is permitted to open. Circuit is now completed from the line conductor 9 through armature 1, field magnet winding 5, coil 43 of the limiting switch 52, resistance sections 47 and 48, and switch 91 to the opposite line conductor 51. Energy is also supplied from the line conductor 9 through switch 85, resistance sections 49 and 50, field magnet winding 8 and armature 3 to the opposite line conductor 51. The two motors are thus connected in parallel circuits. When the switch 85 is closed, a plurality of contact fingers 92, 93 and 94 move into engagement with a bridging contact member 95, so that energy is supplied to finger 64 of the switch 67 and also to the corresponding contact finger of the switch 77. Consequently, the switches 67 and 77 are simultaneously closed subject to the action of the limiting switch 52, and suitable connections for closing the switches 72 and 78 are effected. In this way, the resistance included in each of the multiple circuits containing the motors is simultaneously decreased to zero and the motors are connected directly across the line.

When the controller 10 occupies the position $x$, circuits are established similar to those which correspond to the position $a$ except that, instead of the reversing switches 12, 15, 17 and 18 being closed, the switches 13, 14, 16 and 19 are closed so that the current traversing the motor circuit passes through the armatures of the several motors in the opposite direction. If it is desirable, at any stage of the acceleration of the motors, to prevent an increase in the speed of the vehicle, the master controller 10 may be moved from the position $a$ to the position $b$ or from the position $x$ to the position $y$ as the case may be, in which positions the contact fingers 56 and 58 become dis-engaged from the contact ring segments 57 and it is impossible to supply energy to the conductor 59 from which the actuating coils of the several switches first receive their energy. The switches already closed, however, will be retained in such position since all the other circuits are uninterrupted.

If it is desirable to stop the equipment or to interrupt the supply of energy to the motors, the controller 10 may be moved to the "off" position, when all the switches will be opened.

In order to automatically interrupt the supply of energy to the motors in case their speeds become materially different, a differential relay 44 is included in the battery circuit. This relay comprises a contact bearing core member 45 and similar magnet windings 46 and 53 which are respectively connected across the armatures of motors 1 and 4 and are so arranged that their magnetizing effects upon the core member 45 normally neutralize each other since the electromotive forces at the armatures of the two motors are normally equal. If the speed of one of the motors should be materially increased above that of the other, as is the case when the pair of wheels to which one of the motors is connected slips, the electromotive force applied to one of the windings on the differential relay 44 will be greater than that applied to the other and the core 45 will be so energized as to raise the contact member 33 which bridges the contact members 31 and 32. As soon as the battery circuit is interrupted at this point, the control switches will all be opened, thereby interrupting the supply of energy to the motors and necessitating their re-acceleration. This re-acceleration will automatically take place as soon as the speeds of the motors are again balanced if the master controller still occupies either the position $a$ or the position $x$.

I claim as my invention:

1. In a vehicle, the combination with driving motors therefor, of means dependent upon a material difference in the motor speeds for automatically interrupting the supply of energy to the motors.

2. In a control system for electric vehicle motors, the combination with a plurality of electrically governed switches, of means dependent upon a material difference in the motor speeds for automatically opening said switches.

3. In an electric vehicle, the combination with a plurality of driving motors, of means dependent upon a material difference in the electromotive forces existing across the motor armatures for automatically interrupting the supply of energy to the motors.

4. In a control system for electric vehicles, the combination with a plurality of motors and governing switches therefor, of means dependent upon a material difference in the speed of the motors for automatically opening the switches.

5. In an electric vehicle, the combination with electric driving motors, and a plurality of governing switches for the motors, of a differential relay which is adapted to effect the opening of the switches and is provided with similar opposing coils that are severally connected to the motor armatures.

6. In a control system for electric vehicles, the combination with a plurality of electric driving motors, a plurality of governing switches therefor, a master switch for controlling the governing switches, and a plurality of actuating magnets for said switches, of a differential relay that comprises a core member, a plurality of similar opposing coils which are severally connected across the armatures of said driving motors, and means dependent upon a material difference in the speeds of the motors for automatically interrupting the supply of energy to the actuating coils of the governing switches.

7. In a control system for electric vehicles, the combination with a plurality of electric driving motors, a plurality of governing switches therefor, a master switch for controlling the governing switches, and a plurality of actuating magnets for said switches, of a differential relay that comprises a core member, a plurality of similar opposing coils which are severally connected across the armatures of said driving motors, and means dependent upon a material difference in the energizing currents for the coils of the differential relay for automatically interrupting the supply of energy to the actuating coils of the governing switches.

8. In an electric vehicle, the combination with electric driving motors and control switches therefor that are adapted to be closed in the predetermined sequence, of a differential relay adapted to effect the opening of the switches and comprising similar magnet windings which are severally connected in multiple circuit with the motor armature to normally act in opposition to each other.

9. In an electric vehicle, the combination with electric driving motors, a plurality of electrically operated governing switches therefor which are adapted to close in sequence, and an auxiliary source of energy for effecting the closure of the switches, of means dependent upon a material difference in the motor speeds for automatically interrupting the supply of energy to the switches from said auxiliary source.

10. In an electric vehicle, the combination with electric driving motors, a plurality of electrically operated governing switches therefor which are adapted to close in sequence, and an auxiliary source of energy for effecting the closure of the switches, of means dependent upon a material difference in the electromotive force existing across the motor armatures for automatically interrupting the supply of energy to the switches from said auxiliary source.

11. In an electric vehicle, the combination with electric driving motors, a plurality of electrically operated governing switches therefor which are adapted to close in a predetermined sequence, and an auxiliary source of energy for effecting the closure of the switches, of a differential relay adapted to interrupt the supply of energy to the governing switches and comprising similar magnet windings which are severally connected in multiple circuit with the motor armatures to act in opposition to each other.

12. In an electric vehicle, the combination with electric driving motors, a plurality of electrically operated governing switches therefor adapted to close in sequence, and an auxiliary source of energy for effecting the closure of the switches, of means dependent upon a material difference in the motor speeds for automatically interrupting the supply of energy to the switches from said auxiliary source comprising an electrically operated relay switch having two similar windings that are connected in multiple circuit with the motor armatures and act in opposition to each other, and a movable core member which normally bridges the auxiliary control circuits of the governing switches.

In testimony whereof, I have hereunto subscribed my name this 28th day of September, 1906.

WILLIAM COOPER.

Witnesses:
HOWARD L. BEACH,
BIRNEY HINES.